Patented June 19, 1951

2,557,826

UNITED STATES PATENT OFFICE 2,557,826

METHOD OF MAKING AN ADHESIVE COMPRISING COACTING RESINS AND METHOD OF BONDING BONDABLE MEMBERS UTILIZING SAID COACTING RESINS

Clark M. Keaton and Donald V. Redfern, Seattle, Wash., assignors to American-Marietta Company, Adhesive, Resin and Chemical Division, Seattle, Wash., a corporation of Illinois No Drawing. Application January 18, 1947, Serial No. 722,974

10 Claims. (Cl. 154—140)

The present invention relates to a method of making an adhesive comprising coacting resins and method of bonding bondable members utilizing said coacting resins. In more particular, the present invention relates to an adhesive for use in making a joint or bond and in which joint the adhesive is activated at the time the two parts of the joint are brought together.

Further, the present invention relates to a bonded joint in the making of which two resins, being mutually and readily miscible, are activated at the time the two are brought together to form an adhesive, to such adhesive, and to the method of making such resins, adhesive, and joint.

In the prior art there have been many attempts to make a joint in which one face of the joint is covered with an adhesive, or glue, and the other face of the joint is covered with an activator, or accelerator, so that when the two faces are brought together, the adhesive will be activated and set very rapidly. This rapid setting is desirable, as otherwise it may require that the parts joined together be left in clamps for a period of many hours, or even days, whereas, with activation, the period may be cut down to ten or fifteen minutes. However, where the glue has been placed on one face, and the activator on the other, it has been found that the glue does not adhere well to the face which has the activator applied to it and, therefore, the resulting joint has been a poor joint. See: "Production and Fabrication of Glued Wood Products in Western Germany," by R. M. Seborg and H. O. Fleischer, published as "Fiat Final report No. 366, 16 October 1945," and published by "Office of Military Government For Germany (U. S.), Office of the Director of Intelligence, Field Information Agency, Technical," page 15.

The present invention produces a joint in which the resin adhesion to the faces of the joint is equal on both faces and of a quality equal to that obtainable by any other method of bonding, whether cold-setting, thermoplastic, or hot-setting, by the use of two mutually and readily miscible resins which are activated by each other at the time the two are brought together.

The present invention further involves the placing of a resin on each face of a joint and containing in each resin an activator for the resin on the other face, and which resins are mutually miscible with each other.

The present invention further involves the production of two resins which are mutually miscible with each other and each of which will activate the other.

The desirability of applying resin to each face of the parts to be joined is well recognized in the art. See: "Manual on The Laminating of Timber Products with Low-Temperature, Phenolic-Type Resin Glues, January 1944," prepared by Forest Products Laboratory, Madison, Wisconsin, and Gamble Brothers, Inc., Louisville, Kentucky, and published by U. S. Dept. of Agriculture, Forest Service Forest Products Laboratory, Madison, Wisconsin, as No. R1437, page 26.

The present invention produces a bonded joint by the use of a quick-setting activated phenol-aldehyde resin adhesive which is composed of two resins that are entirely miscible with each other and are capable of catalyzing each other when brought into intimate contact with each other. In the formation of the adhesive, these resins require both an excess of formaldehyde and an excess of caustic soda for rapid setting of each resin at room temperature. The results of this invention are obtained by not placing in either resin enough of the alkali or enough of the formaldehyde to set them when apart. The separate resins are prepared so that alone they will set very slowly but when applied to the faces of the parts to be joined and brought together, they will mix, accelerate each other, set, and quickly give a good bond with both faces of the joint.

The expression "a phenol" as herein used is to be given a recognized meaning in the art and includes both monohydric and dihydric phenols in which one or two hydroxyl groups are attached to the carbon ring.

In carrying out the present invention, the aldehydes used may comprise any of the prior art aldehydes used in producing phenol-aldehyde condensation products, that is, a phenolic resin.

More specifically the present invention is directed to a method of producing a resinous composition, the product derived therefrom, the method of bonding two bondable members with the novel resinous composition herein set forth and the bonded joint produced by said method. More specifically, the present invention is directed to a method of producing a resinous composition comprising forming a primary substantially neutral phenol-aldehyde resin adhesive composition containing a substantially neutral primary thermoplastic phenol-aldehyde resin and an aldehyde setting agent capable of setting said primary adhesive composition and of assisting in the setting of an interacting secondary phenol-aldehyde composition, the constituents of said primary resin composition being incapable of accelerating the period of set of said primary adhesive composition in the absence of sufficient alkali accelerator. There is formed a secondary phenol-aldehyde resin adhesive composition containing a secondary phenol-aldehyde resin, said secondary phenol-aldehyde adhesive composition having present an alkali or an equivalent basic material such as methylene diamine which supplies the alkali or other basic deficiency of said primary phenol-aldehyde resin adhesive composition. Each of the phenol-aldehyde resins may be selected from the group of resins consisting of a dihydroxy benzene-aldehyde resin, a monohydric phenol-aldehyde resin, and mixtures of said resin. The dihydroxy benzene-aldehyde resin may be derived, as is well known in the art, by reacting a dihydroxy benzene in which the hydroxyl groups are attached to the carbon ring and an aldehyde in the molar proportions of less than one of the latter to one of the former to produce a permanently fusible resin, as illustratively set forth in U. S. Patent No. 2,385,372.

The monohydric phenol resin may be derived by reacting a monohydric phenol where at least two of the carbon atoms in the carbon ring in the 2—4—6 positions have hydrogen attached thereto and an aldehyde while maintaining a monohydric phenol-aldehyde molar ratio greater than one. These monohydric phenols, such as phenol per se, cresols including orthocresol, xylenol and mixtures thereof, are well known in the prior art and are illustratively set forth in Van Epps Patent No. 2,360,376 and in the copending Redfern application Serial No. 722,975, filed January 18, 1947, now abandoned, the latter being a continuation-in-part of application Serial No. 510,209, now abandoned, and in Redfern Patent No. 2,457,493 which matured upon application Serial No. 772,016, said application being a continuation-in-part of the prior Redfern application Serial No. 722,975, the latter, as stated, being a continuation-in-part of Redfern application Serial No. 510,209.

The aldehyde which reacts with each phenol to produce said primary and secondary resins and the aldehyde for the setting thereof are characterized by having the aldehyde group as the sole reactive group. The so-constituted primary and secondary resinous compositions are brought together and reacted and mutually interacted and set.

In bonding the two bondable members one to another, one of said resins is applied to a face of a first bondable member and the second of said resins is applied to a face of a second bondable member, and the so-treated faces of the bonded members are assembled together and the resin bond therebetween are set, the resin compositions which are miscible one with the other reacting and mutually reacting when brought together and during setting.

Consider the resin adhesive that bonds the glue joint as being of two parts: Part—A, which is applied to one face of the joint, is composed of an A-resin and an A-accelerator, and Part—B, which is applied to the other face of the joint, is composed of a B-resin and a B-accelerator.

For illustration, and as shown in the given examples, the A-resin may be a neutral resorcin-aldehyde resin, a neutral phenolic-aldehyde resin, or a combination of the two in any proportion. The B-resin may be a similar type resin or alkaline phase of these resins, with a phenol-formaldehyde ratio greater than one.

The A-accelerator and the B-accelerator are added to their respective resins just before their final use. The amount of accelerator added governs somewhat the final life of the resin before setting. The A-accelerator contains a large amount of paraform; in the uses of this adhesive a range of from 10 to 50% of the total mix has been used. Values greater than 50% reduce the life to a point where under ordinary manufacturing conditions the resin cannot be used. The B-accelerator contains about 1 to 2% paraform and from 5 to 50% alkali. This paraform may be omitted, but is present to insure an excess in the final adhesive. The alkali for the B-accelerator may be considered and treated as an excess alkali of the resin and so added directly to the resin after it is first made, as this alkali will not greatly change the storage life of the resin. To both the A and B accelerators are added certain amounts of a filler material, such as wood flour or walnut shell flour. Other alkalies commonly used in making phenol-formaldehyde and resorcin-aldehyde resins, such as potassium hydroxide and methylene diamine may be used in place of sodium hydroxide.

While paraform has been set forth as the most desirable accelerator for use in the A-accelerator, it is desired to point out that the various oxy methylenes which are equivalent to a polymer or homolog of formaldehyde may be used.

Various solvents, and wetting agents, such as methyl-alcohol, various glycols, and any other solvents and wetting agents which are compatible with the resins may be used in various quantities to improve the bonding properties with various types of materials. While resorcin and phenol-aldehyde resins have been set forth above as the preferred resins, any resin made with a dihydroxy-benzene may be used instead of resorcin, as set forth in Philip Hamilton Rhodes, Patent No. 2,385,372, September 25, 1945, and similarly any phenolic resin as described in the patent application of Donald V. Redfern, Serial No. 510,209, filed November 13, 1943, now abandoned, and Clarence F. Van Epps, 2,360,376, October 17, 1944. Similarly, any other exothermic resins which are capable of thermosetting may be substituted for each or both of the preferred resins.

The essential part of the invention is that two miscible resins are provided and that each resin carries the catalyst for the other or that a combination of the two catalysts is needed for the activation of each resin. Such activation, or acceleration, being the activation into the final setting of the resin.

In using the adhesive, Part—A is applied to a face of the joint to be bonded, and Part—B is applied to the other face of the joint. These resins are usually applied in equal quantities by weight, with the preferred total spread being approximately 25 lbs. per 1000 sq. ft. of surface. However, both the individual amounts and the total weight may be varied depending on the quality and type of material being bonded. Also the two parts may be intimately mixed just before being applied to the surface to be glued either by spraying or by the use of glue guns with separate compartments and a single nozzle, or other mechanical devices. After the glue has been applied to the faces of the joint, the faces are brought together under pressure which may vary from contact to 200 lbs. per sq. in., or higher, until the adhesive has set. By quick setting, as disclosed in the invention, is meant any time under four hours which is the shortest time required by any of the present art adhesives.

Various types of materials may be bonded with this adhesive, for example wood, cloth, ceramics, leather, etc.

Whereas, in this invention the resin adhesive is spoken of as quick setting at room temperature, and while it is possible to reduce pressing time to as low as 5 min. at 75° F., by the use of heat this time can be further materially reduced to as short a time as 15 seconds at 285° F. This application of heat may be by high frequency wave devices.

Examples of the present invention are given in the formulations below:

EXAMPLE 1

PART A

*A-resin*

100 parts neutral resorcin aldehyde resin
5 parts methyl alcohol

*A-accelerator*

30 parts paraform
10 parts walnut shell flour

PART B

*B-resin*

53 parts alkali phenol aldehyde resin
29 parts alkali resorcin aldehyde resin
9 parts methyl alcohol
9 parts diethyleneglycol

*B-accelerator*

25 parts sodium hydroxide
25 parts water
8 parts walnut shell flour
2 parts paraform

EXAMPLE 2

PART A

*A-resin*

100 parts neutral resorcin aldehyde resin

*A-accelerator*

30 parts paraform
15 parts wood flour

PART B

*B-resin*

100 parts alkali phenol aldehyde resin

*B-accelerator*

20 parts sodium hydroxide
20 parts water
15 parts walnut shell flour

EXAMPLE 3

PART A

*A-resin*

100 parts neutral resorcin resin
5 parts methyl alcohol

*A-accelerator*

30 parts paraform
10 parts walnut shell flour

PART B

*B-resin*

100 parts alkali resorcin aldehyde resin
19 parts methyl alcohol

*B-accelerator*

25 parts sodium hydroxide
25 parts water
8 parts walnut shell flour
2 parts paraform

EXAMPLE 4

PART A

*A-resin*

50 parts neutral resorcin aldehyde resin
20 parts neutral phenolic aldehyde resin
5 parts diethylene glycol

*A-accelerator*

100 parts paraform
10 parts wood flour

PART B

*B-resin*

100 parts alkali resorcin resin
20 parts methyl alcohol

*B-accelerator*

25 parts sodium hydroxide
25 parts water
8 parts walnut shell flour
2 parts paraform

EXAMPLE 5

PART A

*A-resin*

100 parts neutral phenol resin
5 parts methyl alcohol
5 parts diethylene glycol

*A-accelerator*

30 parts paraform
10 parts walnut shell flour

PART B

*B-resin*

100 parts alkali resorcin resin
20 parts methyl alcohol

*B-accelerator*

25 parts sodium hydroxide
25 parts water
10 parts walnut shell flour

Using the resins of Example 1, 6″ x 6″ 3-ply fir panels were glued using 25 lbs. adhesive per 1000 sq. ft., and pressed at 150 lbs. per sq. in. for five minutes. The shear value and percent of wood failure were as follows:

| Elapsed time after removal from press | Pounds Per Sq. In. | Wood Failure |
|---|---|---|
| Minutes | | Per cent |
| 30 | 167 | 10 |
| 60 | 220 | 60 |
| 120 | 188 | 100 |

The use of the resins set forth in the remaining examples give similar results.

Having thus described our invention, we claim:

1. The method of bonding two bondable members one to the other comprising applying to a face of a first member a primary substantially neutral phenol-aldehyde resin adhesive composition containing a substantially neutral thermoplastic phenol-aldehyde resin and an aldehyde setting agent capable of setting said primary adhesive composition and of assisting in the setting of an interacting secondary phenol-aldehyde composition, the constituents of said primary resin composition being incapable of accelerating the period of set of said primary adhesive composition in the absence of sufficient alkali accelerator, applying to a face of a second bondable member a secondary phenol-aldehyde resin adhesive composition containing a secondary thermoplastic phenol-aldehyde resin and insufficient free aldehyde to set by itself, said secondary resin being incapable of setting to a solid infusible state in the absence of sufficient setting agent, said secondary phenol-aldehyde adhesive composition having present an alkali which supplies the alkali deficiency of said primary phenol-aldehyde resin adhesive composition, each of said phenol-aldehyde resins being selected from the group of resins consisting of a dihydroxy benzene-aldehyde resin, a monohydric phenol-aldehyde resin, and mixtures of said resins, said dihydroxy benzene-aldehyde resin being derived by reacting a dihydroxy benzene in which the hydroxyl groups are attached to the carbon ring and an aldehyde in the molar proportions of less than one of the latter to one of the former to produce a permanently fusible resin, said monohydric phenol-aldehyde resin being derived by reacting a monohydric phenol where at least two of the carbon atoms in the carbon ring in the 2—4—6 positions have hydrogen attached thereto and an aldehyde while maintaining a monohydric phenol-aldehyde molar ratio greater than one, the aldehyde which reacts with each phenol to produce said primary and secondary resins and the aldehyde for the setting thereof having the aldehyde group as the sole reactive group, assembling together the face of said first member carrying said primary adhesive composition with the face of said second member carrying said secondary adhesive composition, and setting the resulting assembly and the resulting resin bond, said resin compositions which are miscible one with the other reacting and mutually interacting when brought together and during setting.

2. The method of bonding two bondable members one to the other comprising applying to a face of a first member a primary substantially neutral resorcin-aldehyde resin adhesive composition containing a substantially neutral thermoplastic resorcin-aldehyde resin and an aldehyde setting agent capable of setting said primary adhesive composition and of assisting in the setting of an interacting secondary phenol-aldehyde composition, the constituents of said primary resin composition being incapable of accelerating the period of set of said primary adhesive composition in the absence of sufficient alkali accelerator, applying to a face of a second bondable member a secondary phenol-aldehyde resin adhesive composition containing a secondary thermoplastic phenol-aldehyde resin and insufficient free aldehyde to set by itself, said secondary resin being incapable of setting to a solid infusible state in the absence of sufficient setting agent, said secondary phenol-aldehyde adhesive composition having present an alkali which supplies the alkali deficiency of said primary resorcin-aldehyde resin adhesive composition, said secondary resins being selected from the group of resins consisting of a dihydroxy benzene-aldehyde resin, a monohydric phenol-aldehyde resin, and mixtures of said resins, said resorcin-aldehyde resin being derived by reacting a resorcin and an aldehyde in the molar proportions of less than one of the latter to one of the former to produce a permanently fusible resin, said monohydric phenol-aldehyde resin being derived by reacting a monohydric phenol where at least two of the carbon atoms in the carbon ring in the 2—4—6 positions have hydrogen attached thereto and an aldehyde while maintaining a monohydric phenol-aldehyde molar ratio greater than one, the aldehyde which reacts with each phenol to produce said primary and secondary resins and the aldehyde for the setting thereof having the aldehyde group as the sole reactive group, assembling together the face of said first member carrying said primary adhesive composition with the face of said second member carrying said secondary adhesive composition, and setting the resulting assembly and the resulting resin bond, said resin compositions which are miscible one with the other reacting and mutually interacting when brought together and during setting.

3. The method of bonding two bondable members one to the other comprising applying to a face of a first member a primary substantially neutral monohydric phenol-aldehyde resin composition containing a substantially neutral monohydric phenol-alde-resin and an aldehyde setting agent capable of setting said primary adhesive composition and of assisting in the setting of an interacting secondary dihydroxy benzene-aldehyde composition, the constituents of said primary resin composition being incapable of accelerating the period of set of said primary adhesive composition in the absence of sufficient alkali accelerator, applying to a face of a second bondable member a secondary dihydroxy benzene-aldehyde resin adhesive composition containing a secondary thermoplastic dihydroxy benzene-aldehyde resin and insufficient free aldehyde to set by itself, said secondary dihydroxy benzene-aldehyde resin adhesive composition having present an alkali which supplies the alkali deficiency of said primary monohydric phenol-aldehyde adhesive composition, said dihydroxy benzene-aldehyde resin being derived by reacting a dihydroxy benzene in which the hydroxyl groups are attached to the carbon ring and an aldehyde in the molar proportions of less than one of the latter to one of the former to produce a permanently fusible resin, said monohydric phenol-aldehyde resin being derived by reacting a monohydric phenol where at least two of the carbon atoms in the carbon ring in the 2—4—6 positions have hydrogen attached thereto and an aldehyde while maintaining a phenol-aldehyde molar ratio greater than one, the aldehyde which reacts with the monohydric phenol-aldehyde resin to produce the primary resin and with the dihydroxy benzene-aldehyde to produce the secondary resin, and the aldehyde for the setting of each of said resins having the aldehyde group as the sole reactive group, assembling together the face of said first member carrying said primary adhesive composition with the face of the second member carrying said secondary composition and assembling the resulting assembly and the resulting resin bond, said resin compositions which are miscible one with the other reacting and mutually interacting when brought together and during setting.

4. The method of bonding two bondable members one to the other comprising applying to a face of a first member a primary substantially neutral phenol-formaldehyde resin adhesive composition containing a substantially neutral thermoplastic phenol-formaldehyde resin and a formaldehyde setting agent capable of setting said primary adhesive composition and of assisting in the setting of an interacting secondary phenol-formaldehyde composition, the constituents of said primary resin composition being incapable of accelerating the period of set of said primary adhesive composition in the absence of sufficient alkali accelerator, applying to a face of a second bondable member a secondary phenol-formaldehyde resin adhesive composition containing a secondary thermoplastic phenol-formaldehyde resin and insufficient free aldehyde to set by itself, said resin being incapable of setting to a solid infusible state in the absence of sufficient setting agent, said secondary phenol-formaldehyde adhesive composition having present an alkali which supplies the alkali deficiency of said primary phenol-formaldehyde resin adhesive composition, each of said phenol-formaldehyde resins being selected from the group of resins consisting of a dihydroxy benzene-formaldehyde resin, a monohydric phenol-formaldehyde resin, and mixtures of said resins, said dihydroxy benzene-formaldehyde resin being derived by reacting a dihydroxy benzene in which the hydroxyl groups are attached to the carbon ring and formaldehyde in the molar proportions of less than one of the latter to one of the former to produce a permanently fusible resin, said monohydric phenol-formaldehyde resin being derived by reacting a monohydric phenol where at least two of the carbon atoms in the carbon ring in the 2—4—6 positions have hydrogen attached thereto and formaldehyde while maintaining a phenol-formaldehyde molar ratio greater than one, assembling together the face of said first member carrying said primary adhesive composition with the face of said second member carrying said secondary adhesive composition, and setting the resulting assembly and the resulting resin bond, said resin compositions which are miscible one with the other reacting and mutually interacting when brought together and during setting.

5. The method of producing a resinous composition comprising forming a primary substantially neutral phenol-aldehyde resin adhesive composition containing a substantially neutral primary thermoplastic phenol-aldehyde resin and an aldehyde setting agent capable of setting said primary adhesive composition and of assisting in the setting of an interacting secondary phenol-aldehyde composition, the constituents of said primary resin composition being incapable of accelerating the period of set of said primary adhesive composition in the absence of sufficient alkali accelerator, forming a secondary phenol-aldehyde resin adhesive composition containing a secondary phenol-aldehyde resin and insufficient free aldehyde to set by itself, said secondary phenol-aldehyde adhesive composition having present an alkali which supplies the alkali deficiency of said primary phenol-aldehyde resin adhesive composition, each of said phenol-aldehyde resins being selected from the group of resins consisting of a dihydroxy benzene-aldehyde resin, a monohydric phenol aldehyde resin, and mixtures of said resins, said dihydroxy benzene-aldehyde resin being derived by reacting a dihydroxy benzene in which the hydroxyl groups are attached to the carbon ring and an aldehyde in the molar proportions of less than one of the latter to one of the former to produce a permanently fusible resin, said monohydric phenol-aldehyde resin being derived by reacting a monohydric phenol where at least two of the carbon atoms in the carbon ring in the 2—4—6 positions have hydrogen attached thereto and an aldehyde while maintaining a monohydric phenol-aldehyde molar ratio greater than one, the aldehyde which reacts with each phenol to produce said primary and secondary resins and the aldehyde for the setting thereof having the aldehyde group as the sole reactive group, bringing said primary and secondary resin compositions together and reacting and mutually interacting said compositions and setting the interacted resultant composition.

6. The method defined in claim 5 in which one of the resins is a resorcin-aldehyde resin.

7. The method defined in claim 5 in which one of the resins is a resorcin-aldehyde resin and the other resin is a monohydric phenol-aldehyde resin.

8. The method defined in claim 5 in which one of the resins is a resorcin-aldehyde resin and the other resin is a monohydric phenol-aldehyde resin, and the aldehyde setting agent is formaldehyde.

9. The method of producing a resinous composition comprising forming a primary substantially neutral phenol-formaldehyde resin adhesive composition containing a substantially neutral primary thermoplastic phenol-formaldehyde resin and a formaldehyde setting agent capable of setting said primary adhesive composition and of assisting in the setting of an interacting secondary phenol-formaldehyde composition, the constituents of said primary resin composition being incapable of accelerating the period of set of said primary adhesive composition in the absence of sufficient alkali accelerator, forming a secondary phenol-formaldehyde resin adhesive composition containing a secondary phenol-formaldehyde resin and insufficient free formaldehyde to set by itself, said secondary phenol-formaldehyde adhesive composition having present an alkali which supplies the alkali deficiency of said primary phenol-formaldehyde resin adhesive composition, each of said phenol-formaldehyde resins being selected from the group of resins consisting of a dihydroxy benzene-formaldehyde resin, a monohydric phenol-formaldehyde resin and mixtures of said resins, said dihydroxy benzene-formaldehyde resin being derived by reacting a dihydroxy benzene in which the hydroxyl groups are attached to the carbon ring and formaldehyde in the molar proportions of less than one of the latter to one of the former to produce a permanently fusible resin, said monohydric phenol-formaldehyde resin being derived by reacting a monohydric phenol where at least two of the carbon atoms in the carbon ring in the 2—4—6 positions have hydrogen attached thereto and formaldehyde while maintaing a monohydric phenol-formaldehyde molar ratio greater than one, bringing said primary and secondary resin compositions together and reacting and mutually interacting said compositions and setting the interacted resultant composition.

10. The method defined in claim 1 in which the bondable members are plywood members.

CLARK M. KEATON.
DONALD V. REDFERN.

REFERENCES CITED

The following references are of record in the file of this patent:

UNITED STATES PATENTS

| Number | Name | Date |
|---|---|---|
| 1,849,109 | Novotny | Mar. 15, 1932 |
| 2,150,698 | Nevin | Mar. 14, 1939 |
| 2,385,372 | Rhodes | Sept. 25, 1945 |
| 2,414,414 | Rhodes | Jan. 14, 1947 |
| 2,414,415 | Rhodes | Jan. 14, 1947 |
| 2,478,943 | Rhodes | Aug. 16, 1949 |